US009437004B2

(12) United States Patent
Siegel et al.

(10) Patent No.: US 9,437,004 B2
(45) Date of Patent: Sep. 6, 2016

(54) SURFACING NOTABLE CHANGES OCCURRING AT LOCATIONS OVER TIME

(71) Applicant: Google Inc., Mountain View, CA (US)

(72) Inventors: Jonathan Siegel, San Francisco, CA (US); Allen Hutchison, San Jose, CA (US); Wenfeng Li, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 123 days.

(21) Appl. No.: 14/311,989

(22) Filed: Jun. 23, 2014

(65) Prior Publication Data

US 2015/0371389 A1 Dec. 24, 2015

(51) Int. Cl.
*G06T 7/00* (2006.01)

(52) U.S. Cl.
CPC ................................ *G06T 7/0044* (2013.01)

(58) Field of Classification Search
None
See application file for complete search history.

(56) References Cited

U.S. PATENT DOCUMENTS

| | | | |
|---|---|---|---|
| 6,609,128 B1 | 8/2003 | Underwood | |
| 7,860,320 B2 * | 12/2010 | Luo | G06K 9/00664 382/227 |
| 7,903,857 B2 * | 3/2011 | Huang | G06K 9/4671 382/131 |
| 8,041,730 B1 | 10/2011 | Upstill et al. | |
| 8,243,997 B2 * | 8/2012 | Davis | G06K 9/0063 382/109 |
| 8,250,481 B2 | 8/2012 | Klaric et al. | |
| 8,326,866 B1 | 12/2012 | Upstill et al. | |
| 8,463,487 B2 | 6/2013 | Nielsen et al. | |
| 8,473,148 B2 | 6/2013 | Nielsen et al. | |
| 8,527,538 B1 | 9/2013 | Upstill et al. | |
| 8,542,884 B1 | 9/2013 | Maltby, II | |
| 8,612,465 B1 | 12/2013 | Brewington | |
| 2001/0038718 A1 | 11/2001 | Kumar et al. | |
| 2005/0195096 A1 | 9/2005 | Ward et al. | |
| 2006/0228019 A1 | 10/2006 | Rahmes et al. | |
| 2007/0242901 A1 * | 10/2007 | Huang | G06K 9/4671 382/294 |
| 2010/0189313 A1 * | 7/2010 | Prokoski | A61B 5/0064 382/118 |
| 2010/0332513 A1 | 12/2010 | Azar et al. | |
| 2011/0082846 A1 | 4/2011 | Bamba et al. | |

(Continued)

OTHER PUBLICATIONS

Brian E. Brewington, Observation Of Changing Information Sources, Jun. 2000, 156 pages, retrieved from the internet: <http://agent.cs.dartmouth.edu/papers/brewington:thesis.pdf>.

(Continued)

*Primary Examiner* — Tahmina Ansari
(74) *Attorney, Agent, or Firm* — Lerner, David, Littenberg, Krumholz & Mentlik, LLP

(57) ABSTRACT

An exemplary method for surfacing feature changes occurring over time at a location is provided. The method includes identifying sets of images captured at a location over a period of time. The sets of images depict objects at the location. Visual changes at the location over the period of time are determined for a given physical feature of the objects depicted in images from the sets of images based on at least a comparison of features in corresponding areas of a first and a second 3D geometry of the location associated with the images. The first and second 3D geometries depict physical features of objects at the location at different times. The sets of images may be ranked based on the determined visual changes for each set. A given set of images from the sets of images may be selected for display on a user interface based on the ranking.

20 Claims, 11 Drawing Sheets

(56) References Cited

U.S. PATENT DOCUMENTS

| | | |
|---|---|---|
| 2012/0086725 A1 | 4/2012 | Joseph et al. |
| 2013/0016877 A1* | 1/2013 | Feris ................. G06K 9/00771 382/103 |
| 2013/0112407 A1* | 5/2013 | Cheng .................... G01V 11/00 166/250.15 |
| 2013/0132366 A1 | 5/2013 | Pieper |
| 2013/0174072 A9 | 7/2013 | Nielsen et al. |
| 2015/0196839 A1* | 7/2015 | Ehrman ................ A63F 7/0664 463/39 |

OTHER PUBLICATIONS

Hernandez, C., Vogiatzis, G., & Furukawa, Y. (Jun. 14, 2010). 3d Shape Reconstruction from Photographs: a Multi-View Stereo Approach. Half-day tutorial at CVPR 2010, 3 pages. Retrieved from: <http://carlos-hernandez.org/cvpr2010/>.

P. Coppin, I. Jonckheere, K. Nackaerts, B. Muys and E. Lambin, Digital Change Detection Methods in Ecosystem Monitoring: A Review, May 10, 2004, 32 pages.

* cited by examiner

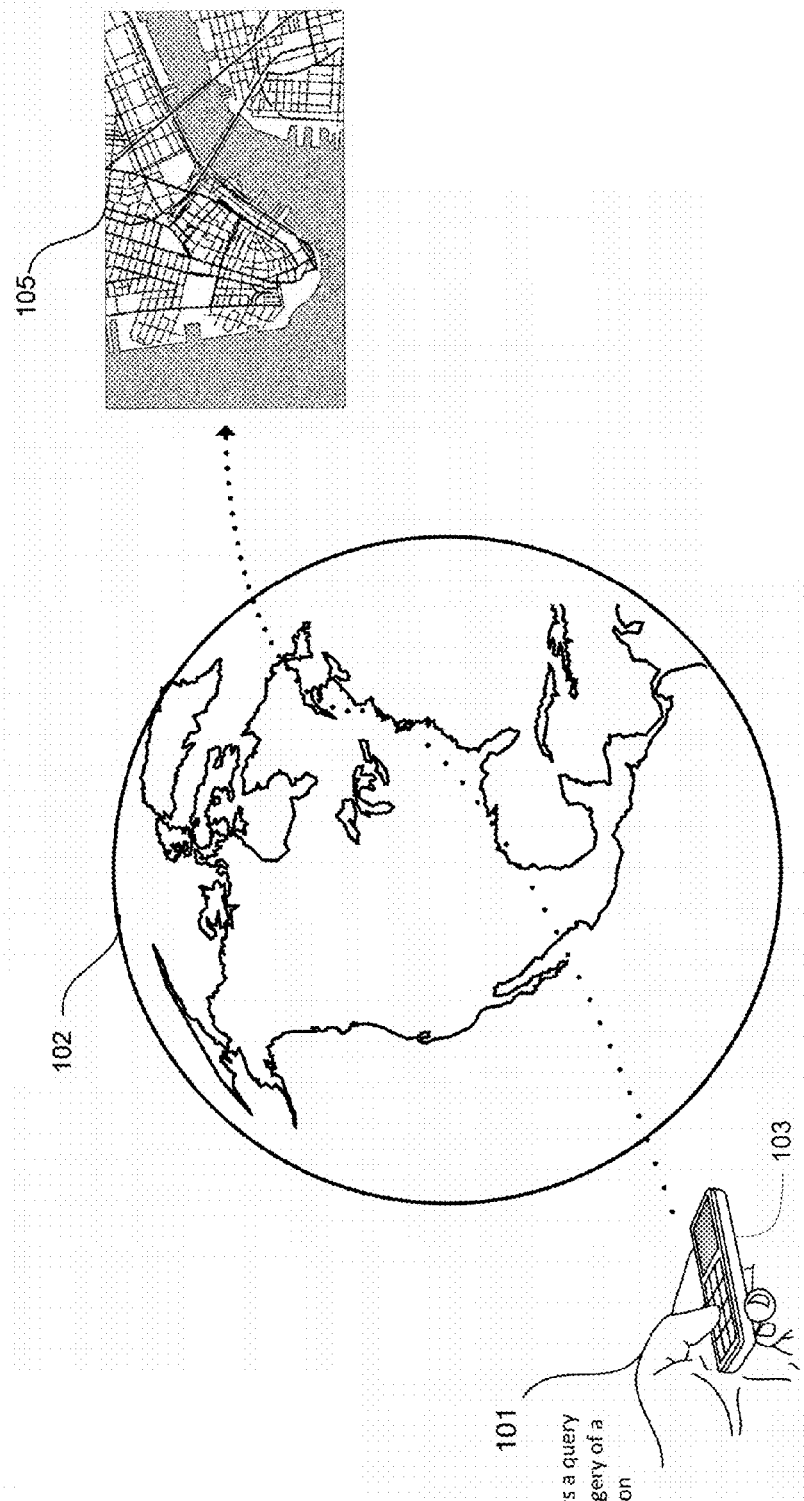

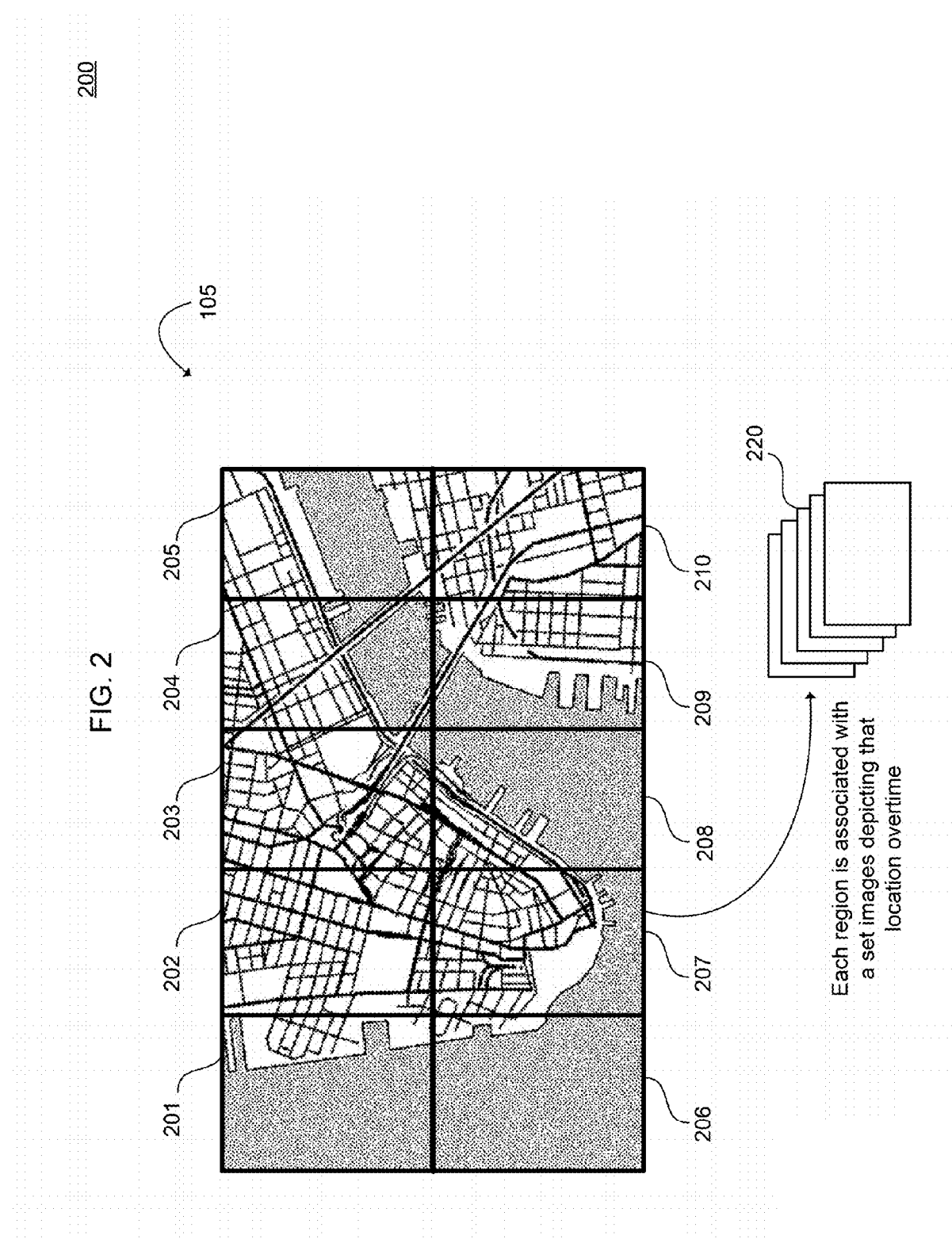

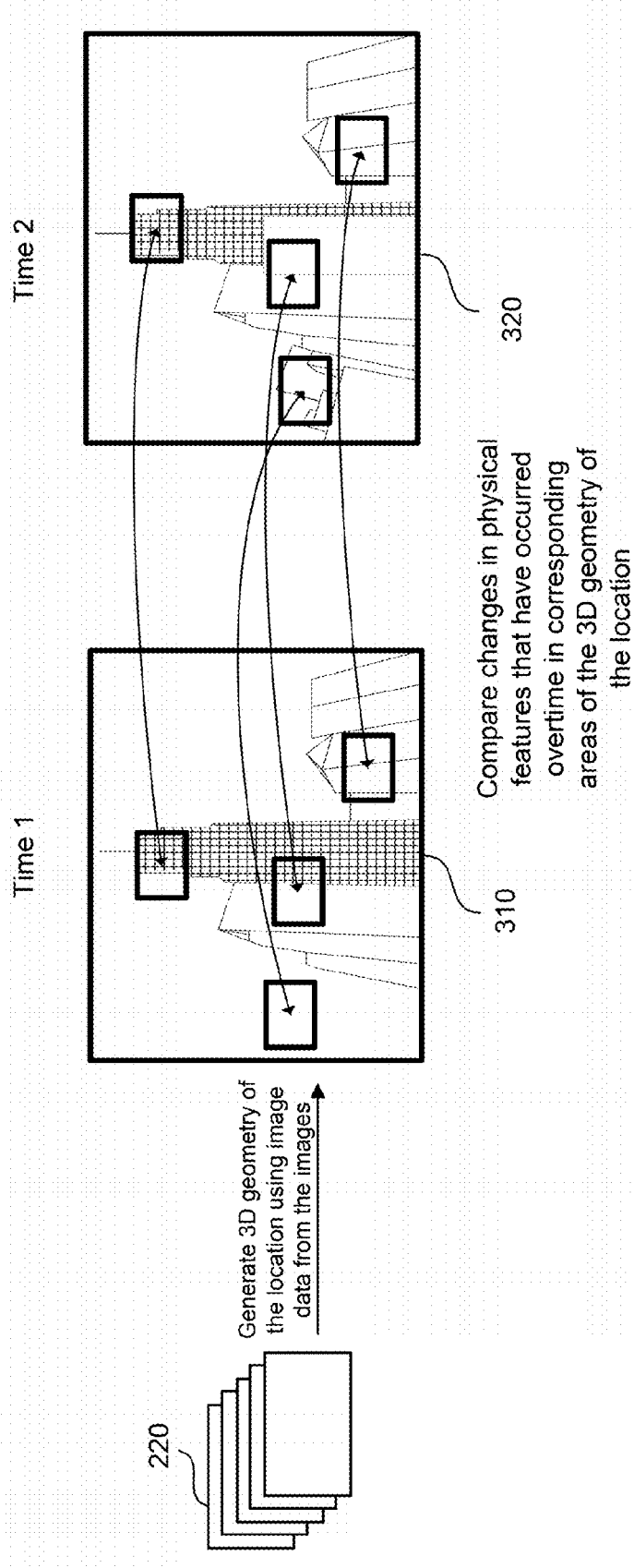

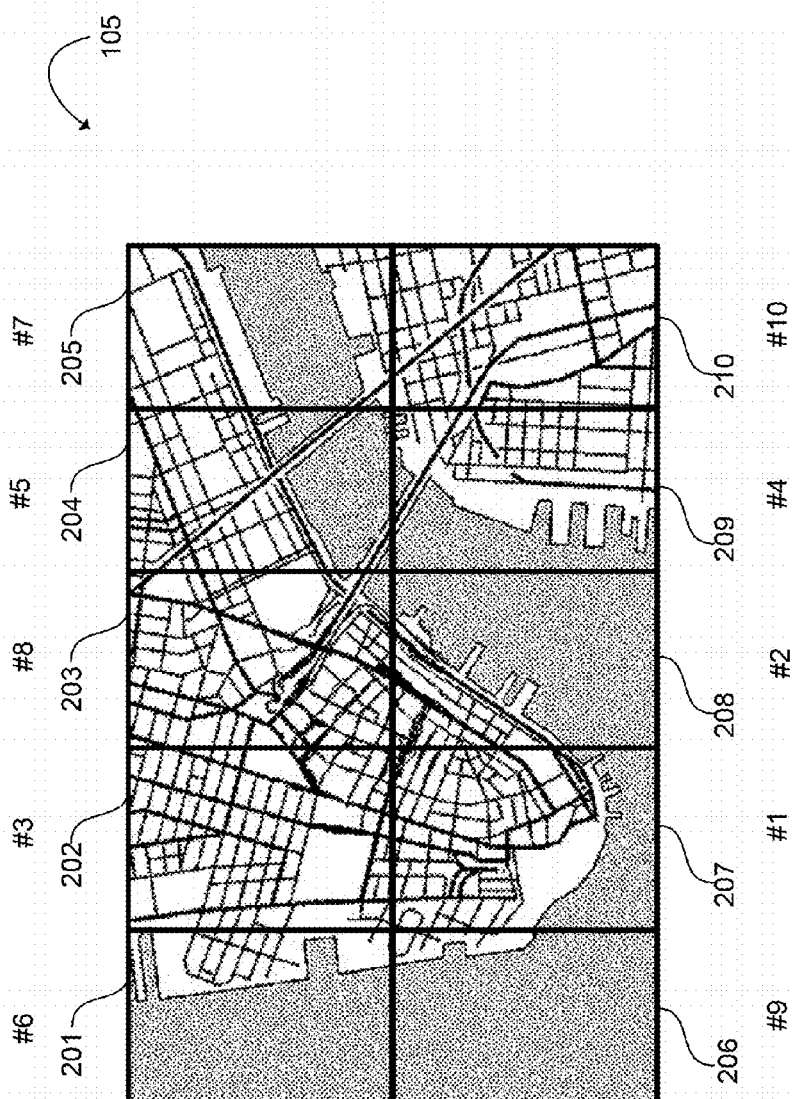

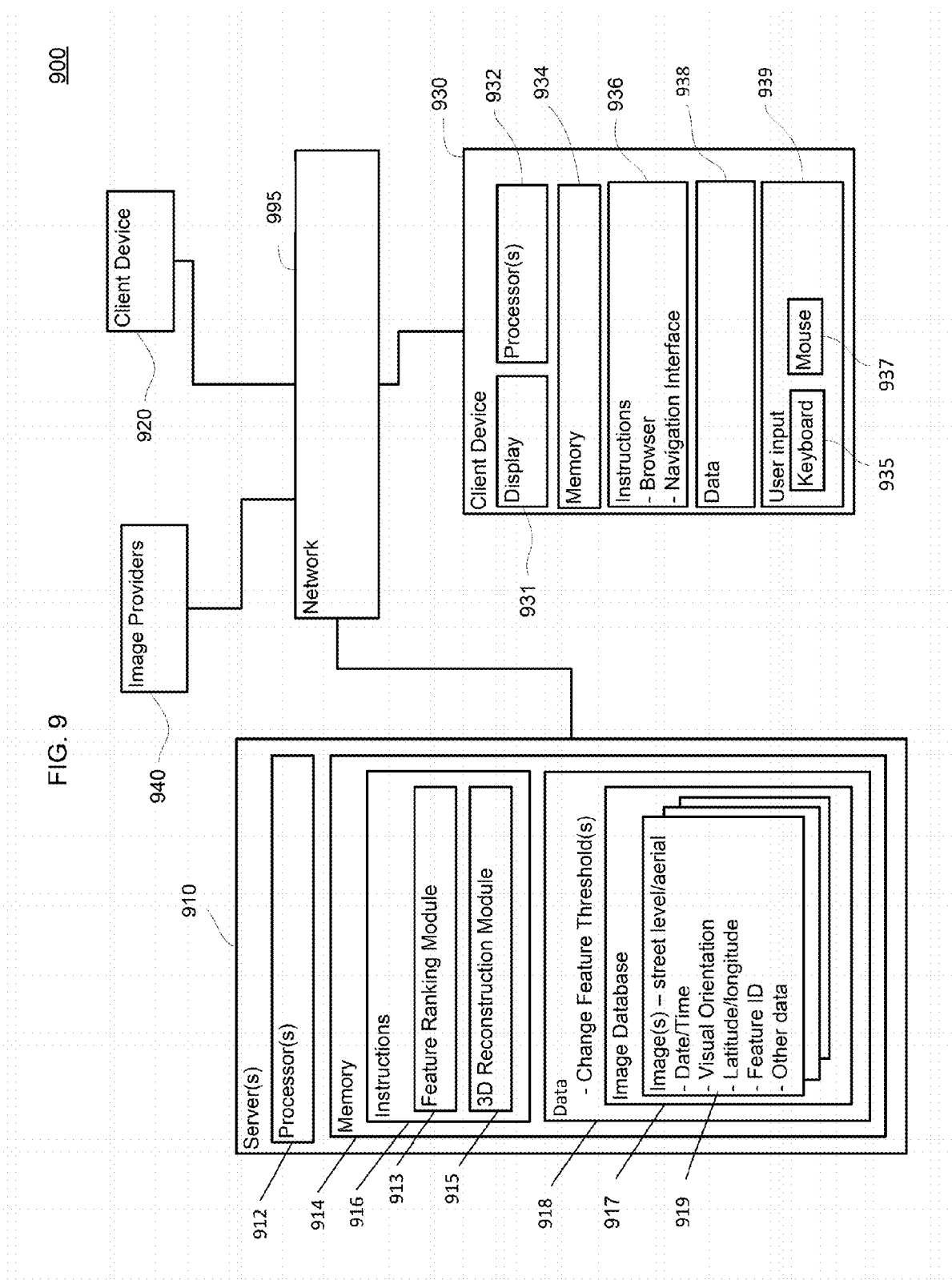

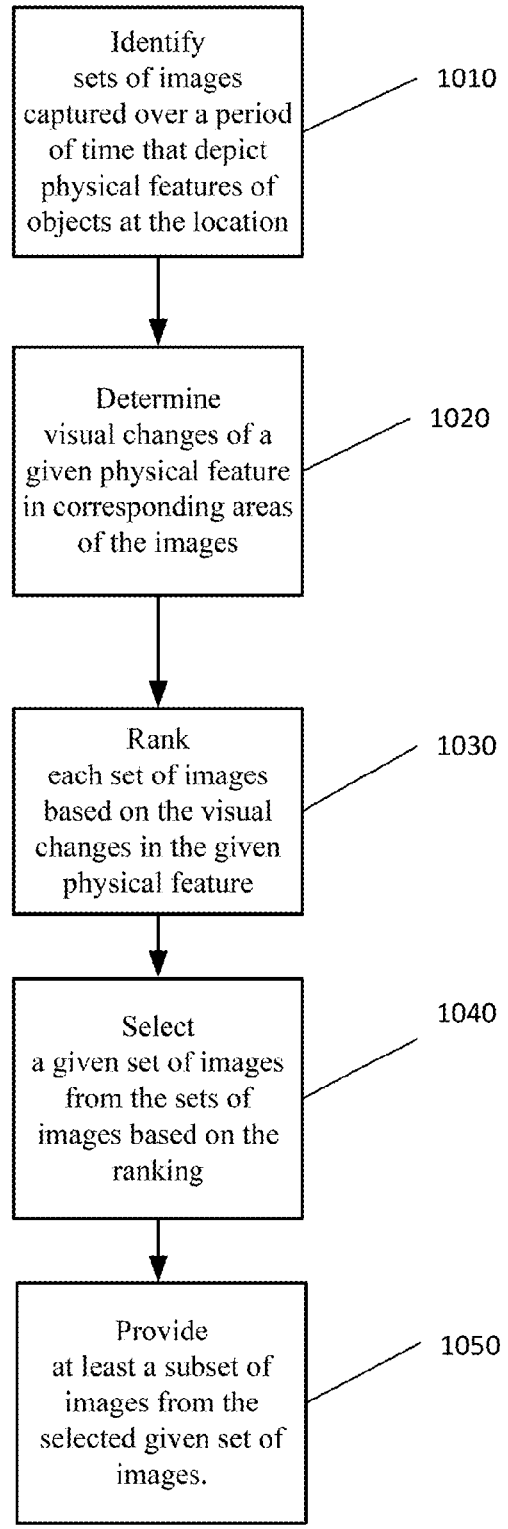

SURFACING NOTABLE CHANGES OCCURRING AT LOCATIONS OVER TIME

BACKGROUND

Various services may provide images of geographic locations to users. Typically in such services, a client computer may request imagery of a particular location and receive a plurality of images, such as digitized panoramic 360 photographs, in response. The images are received from different sources and may be grouped by locations where the images were taken. In some examples, these images may include photographs of real world locations, which may allow users to view these locations.

User searches for maps and photos using such services for displaying imagery may often return images of a place at the most popular times for taking pictures and under perfect conditions. However, as the landscape of these locations change, the images returned to the user may not demonstrate these changes in relevant context to where the user can discover and consider such changes.

BRIEF SUMMARY

Aspects of the disclosure provide a computer implemented method. The method includes identifying, by one or more computing devices, sets of images captured at a location over a period of time. The sets of images depict objects at the location. Using the computing devices, a first and a second 3D geometry of the location may be generated based on the sets of images. The first and second 3D geometries depict physical features of objects at the location at different times. Visual changes at the location over the period of time for a given physical feature of the objects depicted in images from the sets of images are determined, based on at least a comparison of features in corresponding areas of the first and second 3D geometries of the location. Thereupon, the sets of images are ranked based on the determined visual changes for each set of the sets of images and a given set of images from the sets of images may be selected based on the ranking. The given set of images depicting visual changes occurring over time at the location.

In one example, a request for imagery related to the location may be received. In response to the request, one or more images may be provided from the selected set of images. In this example, providing the one or more images may include determining whether the visual changes of the given physical feature in images from the selected set of images satisfies a predetermined change threshold level. When the visual changes satisfy the predetermined change threshold level, the one or more images are provided. In that regard, determining the visual changes may include determining change scores for the given physical feature depicted in corresponding areas of the first and second 3D geometries associated with the sets of images and selecting images from the sets of images based at least in part on the change scores. In some aspects, the first 3D geometry depicts objects at the location at a first time and the second 3D geometry depicts objects at the location at a second time. This second time may occur after the first time.

In another example, providing the one or more images may include identifying a landmark within a viewing angle of the selected images associated with the location and selecting images that depict changes to the landmark over time, or receiving a request for images of the location based on an identified physical feature and selecting images that depict changes of the identified physical feature that occurred over time at the location.

In another embodiment, a non-transitory computer readable medium is provided. The non-transitory computer readable medium includes instructions that, when executed by one or more processors, cause the processors to perform a method. The method includes identifying, by the processors, sets of images captured at a location over a period of time. The sets of images depict objects at the location. Using the processors, a first and a second 3D geometry of the location may be generated based on the sets of images. The first and second 3D geometries depict physical features of objects at the location at different times. Visual changes at the location over the period of time for a given physical feature of the objects depicted in images from the sets of images are determined, based on at least a comparison of features in corresponding areas of the first and second 3D geometries of the location. Thereupon, the sets of images are ranked based on the determined visual changes for each set of the sets of images and a given set of images from the sets of images may be selected based on the ranking. The given set of images depicting visual changes occurring over time at the location.

In yet another embodiment, a system is provided. The system includes a memory and one or more processors coupled to the memory. The one or more processors are configured to identify sets of images captured at a location over a period of time. The sets of images depict objects at the location. Using the processors, a first and a second 3D geometry of the location may be generated based on the sets of images. The first and second 3D geometries depict physical features of objects at the location at different times. Visual changes at the location over the period of time for a given physical feature of the objects depicted in images from the sets of images are determined, based on at least a comparison of features in corresponding areas of the first and second 3D geometries of the location. Thereupon, the sets of images are ranked based on the determined visual changes for each set of the sets of images and a given set of images from the sets of images may be selected based on the ranking. The given set of images depicting visual changes occurring over time at the location.

BRIEF DESCRIPTION OF THE DRAWINGS

FIG. 1 is an example of image querying in accordance with aspects of the disclosure.

FIG. 2 is an example of map data in accordance with aspects of the disclosure.

FIGS. 3A-3B are examples of an image processing technique in accordance with aspects of the disclosure.

FIG. 4 is an example of a ranking technique in accordance with aspects of the disclosure.

FIG. 9 is a block diagram of a system in accordance with aspects of the disclosure.

FIG. 10 is a flow diagram in accordance with aspects of the disclosure.

DETAILED DESCRIPTION

Figure 3B:
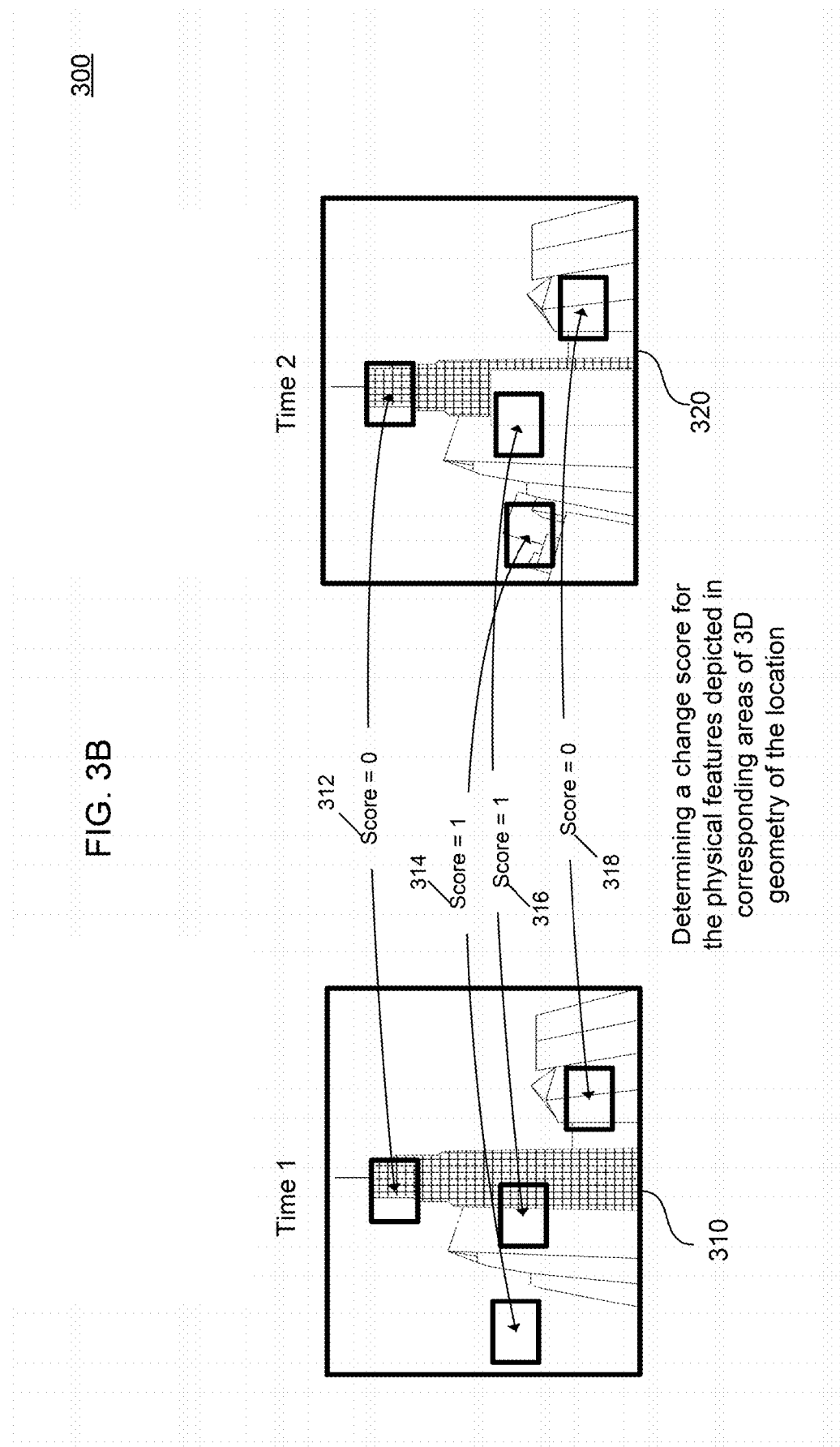

The present disclosure generally relates to techniques for providing a set of geographic imagery of a location that identifies or demonstrates notable feature changes that have occurred at the location over time. For example, a system may be provided that can surface or otherwise detect these notable feature changes by ranking sets of geographic imagery captured at the location over a given time period. The notable feature changes can include one or more regions of the location that has more visible or otherwise physical changes than in other regions of the location. For example, the notable feature changes can include construction changes to the location such as buildings being built on a vacant lot or buildings being modified to include new levels. In some embodiments, the notable feature changes can include areas of the location that have changed due to some type of destructive event like a fire, or where dilapidated buildings have been leveled or other variations to the location. These notable feature changes may be used to serve images to users, for example, on or in conjunction with a map of the location.

In a first example, a user may search for images of a location using a computing device and in response, receive images of the location that depict the notable feature changes. In this example, the computing device may send the request to a server computing device to identify the sets of images of the location that were captured over a period of time. For example, the identified image sets may be provided by a source, such as an image provider, or the identified images may be publicly available imagery posted online. These images include aerial and street level images depicting objects at the location.

Three-dimensional (3D) geometry of the location may be generated based on the identified images. The 3D geometry may represent a visual 3D reconstruction of objects at the location depicted in the images. This 3D reconstruction may be generated using various techniques, e.g., by triangulating a view of the objects at the location using images data stored with the retrieved images, by extracting geometric data regarding the features of objects in the images using laser sensors, by tagging the changes in the images at capture time, by analyzing the images using OCR techniques, and by various other ways.

In some examples, the system may detect changes in visual features from the retrieved sets of images, for example, based on a visual comparison of physical features in the 3D geometry of the location associated with the images. In some embodiments, the visual feature changes can be detected by processing the imagery (e.g., as a batch job) before a user even gets involved. For example, in some aspects, a change score can be determined for a given feature of objects depicted in images. The change score may represent a difference between the given features as depicted in corresponding areas of the 3D geometry of the location from different time periods. Thereupon, the sets of images of the location are ranked based on the change scores for the 3D geometry associated with each individual set of images. The set of images with the highest rank may have a greater amount of visual change in a given physical feature for that area of the location than other areas within the location.

Returning to the first example above, in response to the user's request, images from the set of images with the highest rank may be provided for display by the system. In one example, the display may include a small timeline of imagery from the set of images with the highest rank. This timeline may be displayed on a client computing device using a user interface such as a web browser. In this example, the timeline may include an interactive preview thumbnail component that allows the user to click on a thumbnail in order to facilitate a fuller experience of viewing the imagery like a time lapses video of the location using the highest ranked set of images.

Turning to a second example, the display may include a map where images depicted in certain areas that meet a predetermined change threshold are tiled over the map at locations corresponding to the areas. When the user clicks on one of the tiled areas of the map, images showing the changes that have occurred in that area over time are presented to the user.

In a third example, the display may identify changes that have occurred over time to nearby landmarks that are within the location. In that regard, an annotation, icon, or other indicators for the imagery of the landmark may be rendered in a view over the landmark on a display. When a user selects the icon, such as by using a mouse pointer to click on the icon or a finger to tap on the icon using a touchscreen, images showing the changes to that landmark over time may be presented to the user.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

FIG. 1 is an example of image querying 100. As discussed above, a user 101 may access a map 102 using a computing device 103, such as a mobile phone, to request a view of certain imagery of a geographic location 105 on the map 102. In response to the request, the user 101 may receive a number of images related to the location 105. In some aspects, the user 101 may utilize an application associated with the computing device 103 for accessing the map 102. In some embodiments, the user may have to install the application and/or select a service in order to obtain the benefits of the techniques described herein.

The application may be downloaded onto mobile computing device 103. For example, the user 101 may select to download the application from a service associated with a server computing device such as an online server. The computing device 103 may transmit a request for the application over a network and in response, receive the application from the service. The application may be installed locally at the mobile computing device 103. Alternatively, the application can be stored at the service and may be accessed using the computing device 103, for example, via a mobile web browser.

To locate images of the location 105, the application may use information associated with the images. As an example, location information may be record with the images indicating a geographic position (e.g., latitude/longitude and altitude coordinates) of where the images were captured. Location information of the retrieved images may correspond or otherwise overlap with the geographic coordinates associated with the location 105 on map 102 that the user 101 wishes to view.

In some embodiments, the images may be provided from various sources. For example, the images may include images collected at street level using vehicles, bicycles, or backpacks equipped with cameras. In another example, the images may include images collected from an aerial position using, e.g., airplanes or satellites. In still another example, the images may include images that are posted and shared publicly online or images collected using various other sources.

By using the application, user 101 may retrieve images that indicate notable feature changes that have occurred at the location 105. In some aspects, these features may include one or more visible location changes that can represent changes in businesses, landmarks, government structure or other visible changes that have occurred at that location. In some embodiments, a feature identifier for the visible features may be stored with the images, for example, at capture time in metadata. The feature identifier may include information regarding, e.g., a business entity name that has been tied to a set of images collected on site at the business, an outside business façade or address sign, manual tags of features in the images or tags for other known features of the location 105 that can be visual matched with features in the images.

In FIG. 2, location 105 is depicted. As shown, the location 105 may include one or more of regions 201-210 that may be of interest to the user 101. For example, the regions may be within a certain threshold range of the location associated with the user requested imagery. Each region may be associated with a set of images that visually depict that area of the location 105. For example, region 207 of location 105 may be associated with image set 220, which may have been gathered from various image sources as discussed above. In some embodiments, the sets of images for each region of location 105 may be processed some time before the user requested the images in order to catalog notable features and the changes thereto that may be occurring at the location over time.

FIGS. 3A and 3B are an example of an image processing technique 300. In this example, the images sets associated with each region are processed, for example, during an automated server batch job. For example, image set 220 for region 207 of location 105 may be processed in order to facilitate the ranking of all the images for the location as described in more detail below. During the image processing, 3D geometry of location 105 may be generated using images from the image set 220. The 3D geometry represents a visual 3D reconstruction (e.g., a geometric view) of objects depicted in the image set 220. As discussed above, this 3D reconstruction may be generated using various imaging techniques, such as a multi-view stereo approach that may consists of segmenting and extracting surfaces of objects from the images in order to assemble a 3D geometric depiction of the objects.

In one technique for generating the 3D geometry, several related image projections may be extracted from the image set 220. The image projections may depict the object at region 207 from different angles, perspectives at a particular time when the images were captured. The image projections from the image set 220 are assembled using image data stored with each related image projection. This stored image data can include geometric data that may indicate the dimensions of objects depicted in the images. In some aspects, image projections may be aligned in the 3D geometry by triangulating a viewing angle of the objects at the location. For example, the alignment of image projections may be conducted using a laser measurement sensor or other OCR techniques in order to measure the geometric data (e.g., corners and depths) associated with the objects depicted in the images. Once the measurements have been taken specific portions of the objects may be aligned within the image projections.

As shown in FIG. 3A, 3D geometries 310 and 320 may be created using images from image set 220. Each of 3D geometries 310 and 320 may depict the location at different times. For example, 3D geometry 310 may depict the location at a certain time (e.g., time 1) while 3D geometry 320 may depict the location as represented sometime thereafter (e.g., time 2). If there are more times available in the image set 220, then additional 3D geometries may be generated. That is, the image set 220 may include images depicting the location over several different days, months and/or years. In some aspects, changes between 3D geometry 310 and 320 can be detected by visually comparing physical features in a plurality of corresponding areas between the two 3D geometries. For example, the physical features can be compared using various image analysis techniques. An example of an image analysis technique is further discussed below.

Turning to FIG. 3B, in one example of image analysis technique, a number of change scores 312-318 are determined. In some embodiments, the changes scores are determined for each region within location 105. In this example, changes scores 312-318 may be determined based on a visual difference in physical features of objects depicted in the corresponding areas between the 3D geometries 310 and 320.

By way of example only, each change score may represent a correlation between features of objects as depicted in the corresponding areas of the 3D geometries. For example, if the change score=0, this may indicate that the physical features of objects in the corresponding areas associated with that score have not changed. If the change score=1, this may indicate that the physical features of objects in the corresponding areas associated with this score have changed by a certain degree. In this example, the change in physical features may indicate construction changes at the location due to present of new buildings.

Visual differences in the corresponding areas can be determined, for example, by using various techniques. By way of example only, in one example technique, vision image measurements for the physical features can be taken in each of the corresponding areas of 3D geometry 310 and 320. A difference between these measurements can be calculated and used to represent the change score for that area. In one example, the visual differences can be determined by using a color analysis. For example, differences in color over certain corresponding areas of the 3D geometries can be detected and used to indicate significant changes in that area. This may be particularly useful to detect changes in certain locations, such as in a city skyline and in rural areas.

In other embodiments, the change score can be further or alternatively be based on a correlation between other image information stored with the image set 220 or other conventional image analysis methods.

Before selecting images of location 105 to be displayed to the user, the regions 201-210 within the location 105 may be ranked based on a corresponding ranking for the sets of images associated with each region. FIG. 4 is an example of a ranking technique 400. As noted above, each region of location 105 may be associated with a set of images depicting that region of the location. These sets of images may be ranked, for example, based on the change scores, which may indicate an amount of visible changes that have occurred in a particular region as compared to the other regions as described above. For example, the change scores for the particular region may be totaled and associated with the set of images depicted the region. The set of images with a highest rank, in the example of FIG. 4, the set of images for region 207 having the rank of #1, may have a highest total change score associated with the image. While the set of images for region 210 having the rank of #10 may have a lowest total change score when compared to the total changes scores for each other region.

If the set of images associate with a particular region is sufficiently high ranked, one or more images of the set of images for that particular region may be included in the images provided to the user. For example, if the change scores for the set of images associated with the particular region satisfy a predetermined change threshold, then one or more images from this high ranked set of images may be provided on a display of the user's client device.

A user may be provided with a variety of different interfaces for which high ranked images are available for display. In some situations, the user may want navigate through these images, for example, as if watching a time-lapse video of visual changes at the location.

Figure 5:
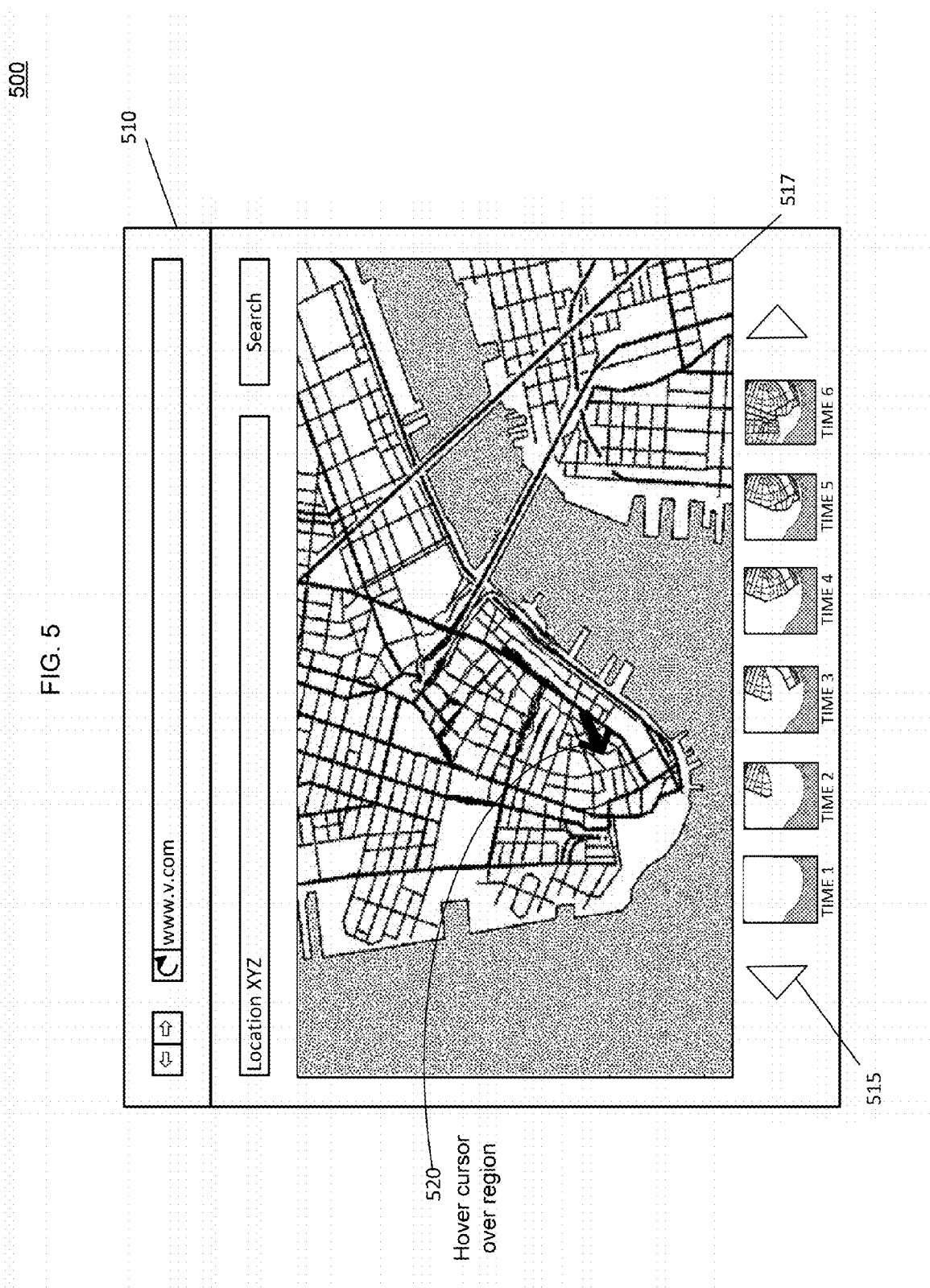
FIG. 5 is an example of a user interface in accordance with aspects of the disclosure.

FIG. 5 is an illustrative example 500 of a web browser type user interface 510. The interface 510 may provide a user with access to the high ranked images. The interface 510 may be flexibly configured to include various types of buttons, cursors, and tools as well as formatted image content on a display 517. As shown in FIG. 5, the interface 510 may also include a series of thumbnails in a preview section 515.

Thumbnails in the preview section 515 may comprise, for example, an actual image, a modified version of the image, such as an image from the 3D geometry of the location, content related to the image, a network location (e.g., a Uniform Resource Locator), or other information which can be used to retrieve the image. As shown in FIG. 5, each thumbnail may indicate a time dimension, such as a time indicating when the images were captured. Upon selection of a thumbnail, for example, by using a user input device, one or more images can be displayed. In some embodiments, the images may be displayed one at a time in rapid succession. For example, as the user input device, such as cursor 520, hovers over a particular region on the display 517, the preview section 515 may successively display high ranked images associated with this region as though traveling through the time dimension.

Figure 6:
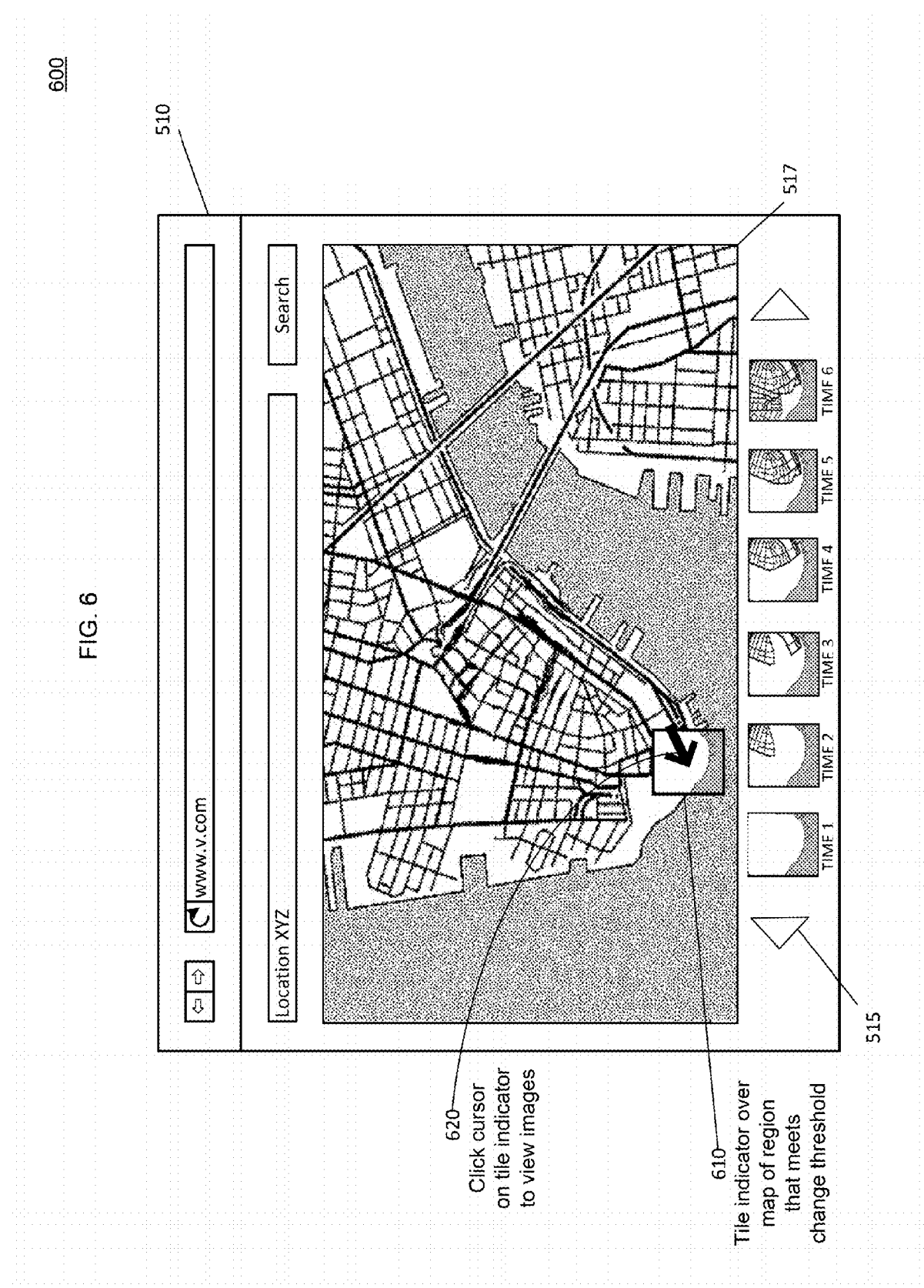
FIG. 6 is another example of the user interface of FIG. 5 in accordance with aspects of the disclosure.

In FIG. 6, another example 600 of the user interface 510 of FIG. 5 is shown. In this example, the interface 510 may include a tile indicator 610 on the display 517 that has been placed over a map of a particular region of the location. The tile indicator 610 may indicate that this region has a highest amount of notable feature changes based on a ranking of the images associated with the location. For example, change scores for the images associated with this region may satisfy a predetermined change threshold indicating that the images are highly ranked as compared to images of other regions.

In some embodiments, if the user clicks cursor 620 on the tile indicator 610, these high rank images showing changes that have occurred in that area over time may be successively presented to the user. For example, the images may be shown in a tile area over the tile indicator 610 or in the preview section 515 of the user interface 510.

Figure 7:
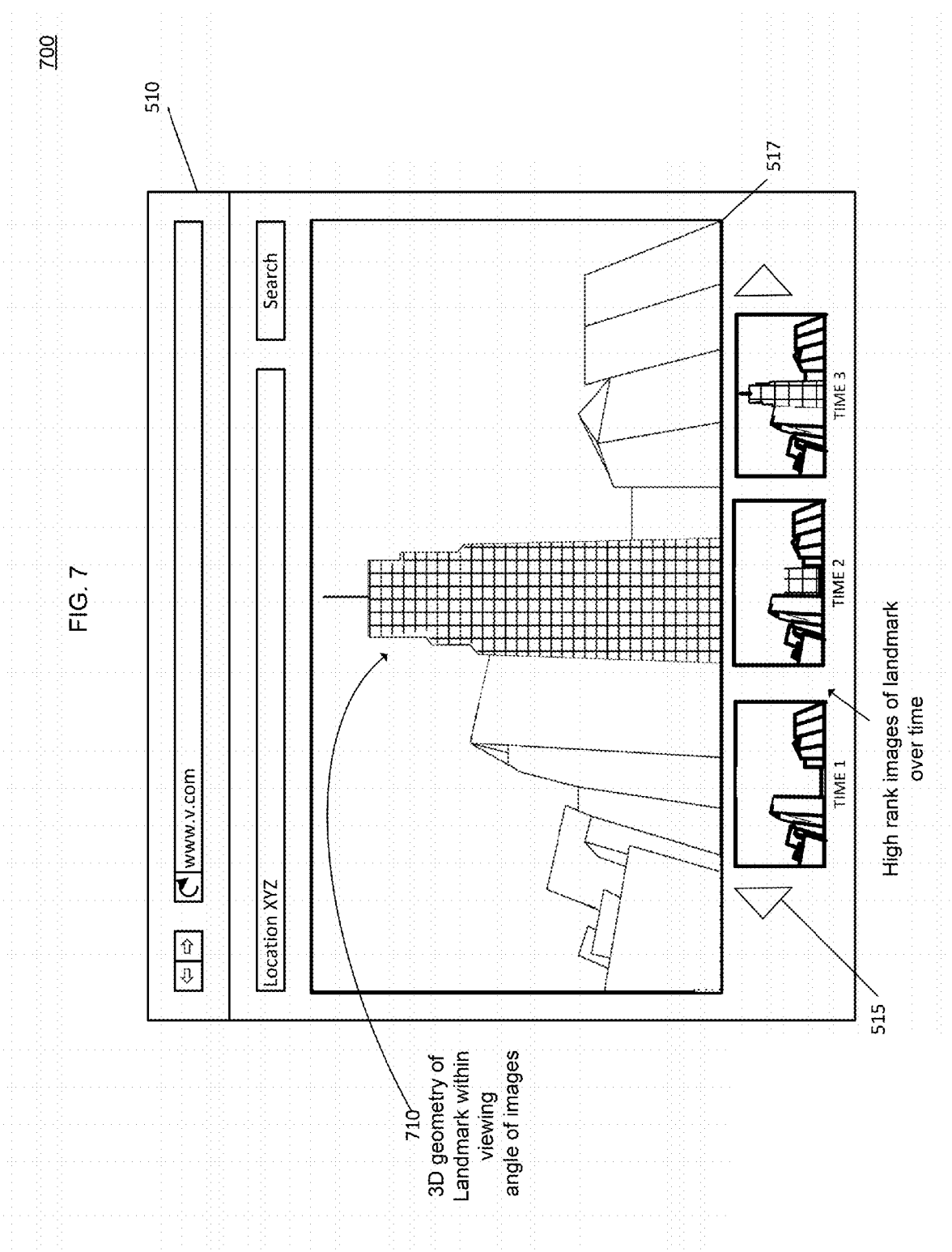
FIG. 7 is yet another example of the user interface of FIG. 5 in accordance with aspects of the disclosure.

In FIG. 7, yet another example 700 of the user interface 510 of FIG. 5 is shown. In this example, if a significant landmark 710 is within a viewing angle of the area of the location that has the highest amount notable feature changes, then images of that landmark may be presented to the user. These images may show changes to the landmark 710 have occurred over time, such as changes during a construction or renovation time period. In some aspects, the landmark 710 may be identified based on a correspondence between coordinates for the landmark and coordinates associated with the images. Alternatively, the landmark 710 may be identified by analyzing the 3D geometry associated with the images of the location to determine if known features, such as a street sign or outer façade, of the landmark are visible.

An annotation or type of icon (not shown) for the images may be rendered in over an image of the landmark 710 on the display 517. By hovering, for example, a user input device, over the icon, the user may be shown a preview of the highly ranked imagery. For example, the images may be displayed in the preview section 515 of the interface 510. In some embodiments, this rendering may be augmented with the 3D geometry of the landmark 710 that may have been generated during the image processing steps as discussed above.

While it can be possible to perform aspects of the image processing and/or ranking as described herein with an application installed locally on a mobile device, such as mobile phone, it may be more feasible to do the processing remotely as well as locally (or some combination thereof). For instance, a remote computing device like an application server may perform some or all aspects of the image processing.

Figure 8:
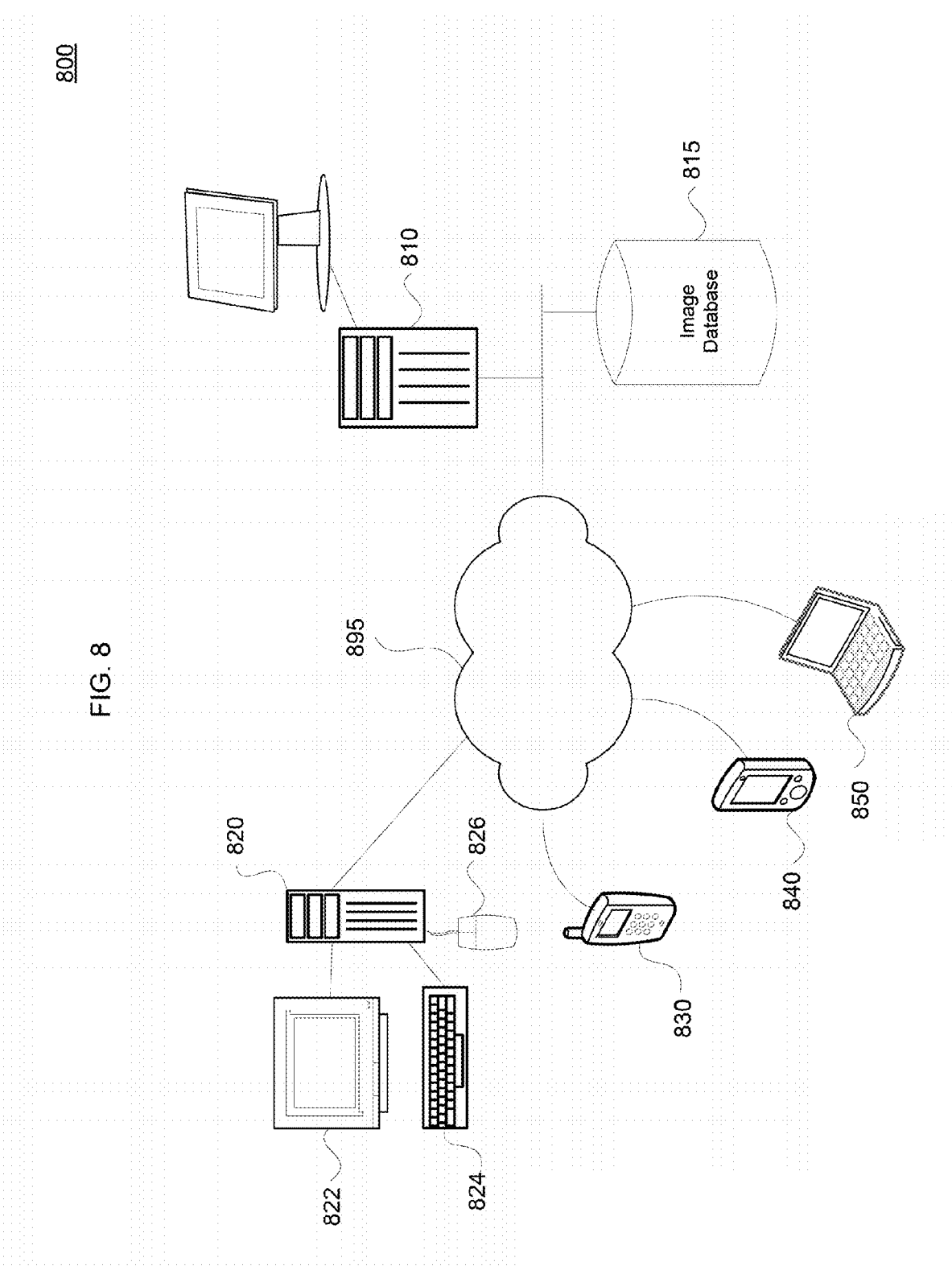
FIG. 8 is a pictorial diagram of a system in accordance with aspects of the disclosure.

FIG. 8 illustrates an example of a system 800 including remote computing devices for performing aspects of the present disclosure. As shown, system 800 depicts various computing devices that can be used alone or in a networked configuration. For example, this figure illustrates a computer network having a plurality of computers 802 and 820 as well as other types of mobile devices like a mobile phone 830, a PDA 840 and a laptop/netbook 850. These various devices may be interconnected via a local bus or direct connection 818 and/or may be coupled via a communications network 895 such as a LAN, WAN, the Internet, etc. and which may be wired or wireless.

Each computing device may include, for example, user input devices such as a keyboard 824 and mouse 826 and/or various other types of input devices such as pen-inputs, joysticks, buttons, touch screens, etc., as well as a display 822, which could include, for instance, a CRT, LCD, plasma screen monitor, TV, projector, etc. Each computer 802 and 820 may be a personal computer, application server, etc. By way of example only, computer 820 may be a personal computer while computer 802 may be a server. Databases, such as image database 815, are accessible to one or more of the servers or other devices of system 800.

FIG. 9 is a block diagram of a system 900, which may be used to surface notable feature changes at locations that have occurred over time as described herein. As shown, the system 900 includes a server 910 coupled to a network 995 and a number of client devices, such as client devices 920 and 930, capable of communicating with the server 910 over the network 995. The server 910 may include one or more processors 912, memory 914, and other components typically present in general purpose computers.

Memory 914 of server 910 may store information that is accessible by the processors 912, including instructions 916 that may be executed by the processors 912, and data 918. The memory 914 may be of a type of memory operative to store information accessible by the processors 912, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 916 and data 918 are stored on different types of media.

Although FIG. 9 functionally illustrates the processors 912 and memory 914 as being within the same block, the processors 912 and memory 914 may actually include multiple processors and memories that may or may not be stored within the same physical housing. For example, some of the instructions 916 and data 918 may be stored on removable CD-ROM and others within a read only computer chip. Some or all of the instructions and data may be stored in a location physically remote from, yet still accessible by, the processors 912. Similarly, the processors 912 may actually comprise a collection of processors, which may or may not operate in parallel.

Data 918 may be retrieved, stored or modified by processors 912 in accordance with the instructions 916. For instance, although the present disclosure is not limited by a particular data structure, the data 918 may be stored in computer registers, in a relational database as a table having a plurality of different fields and records, XML documents, or flat files. The data 912 may also be formatted in a computer-readable format such as, but not limited to, binary values, ASCII or Unicode. By further way of example only, the data 912 may be stored as bitmaps comprised of pixels that are stored in compressed or uncompressed, or various image formats (e.g., JPEG), vector-based formats (e.g., SVG) or computer instructions for drawing graphics. Moreover, the data 912 may comprise information sufficient to identify the relevant information, such as numbers, descriptive text, proprietary codes, pointers, references to data stored in other memories (including other network locations) or information that is used by a function to calculate the relevant data. For example, the data 508 can include a change threshold value can be encoded based on the instructions 916 to indicate a level of change in a certain feature depicted in images 919. The server 110 may have access to the images 919 from image database 917.

Image database 917 may be obtained a plurality of images 919 using a variety of different image providers 940 that are accessible via the network 995. The images 919 may include data that provides an actual image (e.g., a bitmap) as well as other types of data. For example, the images 919 may be associated with data that identifies a location such as a longitude/latitude coordinate of where the image was captured, a date/timestamp indicating when the image was captured, data related to a visual orientation or view angle of the image, a feature identifier, and other data.

The server 910 may be at one node of network 995 and capable of directly and indirectly communicating with other nodes of the network 995. For example, the server 910 may include a web server that may be capable of communicating with client devices 920 and 930 via network 995 such that it uses the network 995 to transmit and display information to a user on a display 931 of the client device 930. Server 912 may also include a plurality of computers, e.g., a load balanced server farm, that exchange information with different nodes of a network for the purpose of receiving, processing and transmitting data to client devices 920 and 930. In this instance, the client devices 920 and 930 will typically still be at different nodes of the network 995 than the computers comprising server 910.

Network 995, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the subject matter disclosed herein are not limited to a particular manner of transmission of information. For example, in some aspects, information may be sent via a medium such as a disk, tape or CD ROM. Yet further, although some functions are indicated as taking place on a single server having a single processor, various aspects may be implemented by a plurality of servers, for example, communicating information to client devices 920 and 930 over network 995.

Each client device 920 and 930 may be configured similarly to the server 910, with one or more processors 932, memory 934, instructions 936, data 938 and all of the internal components normally found in a personal computer. By way of example only, the client device 930 may include a central processing unit (CPU), display device 931 (for example, a monitor having a screen, a projector, a touch-screen, a small LCD screen, a television, or another device such as an electrical device that is operable to display information processed by the processors 932), CD ROM, hard drive, user input devices 939, such as a keyboard 935, mouse 937, touch screen or microphone, speakers, modem and/or network interface device (telephone, cable or otherwise) and all of the components used for connecting these elements to one another.

Client device 930 may be a computing device. For example, client device 930 may be a laptop computer, a netbook, a desktop computer, and a portable personal computer such as a wireless-enabled PDA, a tablet PC or another type of computing device capable of obtaining information via a network like the Internet. Although aspects of the disclosure generally relate to a single client device 930, the client device 930 may be implemented as multiple devices with both portable and non-portable components (e.g., software executing on a rack-mounted server with an interface for gathering location information).

Although the client devices 930 may include a full-sized personal computer, the subject matter of the present disclosure may also be used in connection with mobile devices capable of wirelessly exchanging data. For example, client device 930 may be a wireless-enabled mobile device, such as a Smartphone, or an Internet-capable cellular phone. In either regard, the user may input information using a small keyboard, a keypad, a touch screen or other means of user input. In various aspects, the client devices and computers described herein may comprise a device capable of processing instructions and transmitting data to and from humans and other devices and computers.

Instructions 936 and 916 of the client device 930 and server 110 respectively may be a set of instructions to be executed directly (such as machine code) or indirectly (such as scripts) by the processor. In that regard, the terms "instructions," "steps" and "programs" may be used interchangeably herein. The instructions 936 may be stored in object code format for direct processing by the processor, or in another computer language including scripts or collections of independent source code modules that are interpreted on demand or compiled in advance. Functions, methods and routines of the instructions are explained in more detail below.

As shown in FIG. 9, the instructions 936 may include a browser for displaying network data, and a navigation interface module to allow a user of the client device 220 to interactively navigate over the display of data. The browser provides for the display of network content, such as street level images, a set of search results or any other type of network data, to a user of the client device 930 by sending and receiving data across the network 995. The network data may be received in response to a search query that includes a search key and indication of a geographic location. The search results returned are associated with locations within the geographic region. For example, the search results can be a number of street level images of different buildings or landscapes within the geographic region that were captured over a period of time.

In order to facilitate operations of system 900 for surfacing notable changes, the server 910 may further include a feature ranking module 913 for ranking images 919 based an amount of visual changes that have occurred during a certain time period and a 3D reconstruction module for reconstructing 3D geometry of the locations using images 919 in order to detect the visual changes. The functionally of these modules can exist in a fewer or greater number of modules than what is shown, with such modules residing at one or more computing devices, which may be geographically dispersed. The modules may be operable in conjunction with the client devices 920 and 930 from which it may receive request for images depicting locations and relevant information regarding those images. Thereupon, images depicting relevant visual changes in objects at those locations may be displayed on the devices.

Techniques for surfacing notable changes at a location, for example using system 900 discussed above, will now be described. It should be understood that the following operations do not have to be performed in the precise order described below. Rather, as mentioned above, various operations can be handled in a different order or simultaneously, and operations may be added or omitted.

FIG. 10 is a flow diagram 1000 depicting an example of some of the aspects of system 900 as described above. In block 1010, sets of images captured over a period at certain areas of a location may be identified. The sets of images depict physical features of objects in one or more regions within the location. In some situations, a user may send a query request to a system, such as system 900, to view images depicting the location. In response to the request, the system may identify a number of images related to the location. The identified images may be provided by a source, such as an image provider, or publicly available imagery posted online. These images include aerial and street level images depicting objects at the location.

In block 1020, visual changes of a given physical features of depicted objects may be determined in corresponding areas of the images. In this regard, 3D geometry may be generated based on the images identified in block 1010. The 3D geometry represents a visual 3D reconstruction of objects at the location depicted in the images. Notable changes in features from the identified images may be determined based on a comparison of physical features in corresponding areas of the 3D geometry. A change score is determined for a given feature of objects depicted in images. The change score represents a difference between the given features as depicted in a first and a second 3D geometry for the location. The first and second 3D geometries depict physical features of objects at the location at different times.

In block 1030, each set of images associated with the location may be ranked based on the determined visual changes in the given physical feature as measured by the change score. For example, the images identified in block 1010 may be ranked according to the change scores from block 1020. A total of change scores for a particular set of images may be compared to a total of the scores for the other sets of images. The set of images with a highest rank may have a highest total of change score. The regions of the location associated with these high rank images have a greater amount of change in the given physical feature than other regions of the location.

In block 1040, a given set of images from the sets of images may be selected based on the ranking. For example, one or more images from the highest rank images determined in block 1030 may be provided on a display of the user's client device. These highly ranked images may be images having visual changes that satisfy a predetermined change threshold as determined based on the change score from block 1020.

In block 1050, one or more of images from the selected given set of images may be provided. For example, images from the set of images with the highest rank may be provided for display in an interactive thumbnail interface. This interface may be disposed on a user browser. The interface may include components that allow the user to navigate back and forward thought the imagery as the visual changes are depicted changing over time.

The above-described aspects of the present disclosure may be advantageous for detecting notable feature changes at a location. For example, by ranking sets of geographic imagery of a location across time based on an identified feature, the imagery may be provided to the user in a manner that notes changes to the identified feature that has occurred at the location over time. This allows imagery ranking data to be organized and structured so that it can be easily integrated into multiple systems based on spatial and feature indices. Moreover, the various techniques and parameters disclosed within may be further reconfigured for creating an even more robust system.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The invention claimed is:

1. A computer implemented method, comprising:
    identifying, by one or more computing devices, sets of images captured at a location over a period of time, the sets of images depicting objects at the location;
    generating, by the one or more computing devices, a first and a second 3D geometry of the location based on the sets of images, the first and second 3D geometries depicting physical features of objects at the location at different times, wherein each 3D geometry represents a 3D reconstruction of the objects in the sets of images;
    determining, by the one or more computing devices, visual changes at the location over the period of time for a given physical feature of the objects depicted in images from the sets of images, based on at least a comparison of features in corresponding areas of the first and second 3D geometries of the location;
ranking, by the one or more computing devices, the sets of images based on the determined visual changes for each set of the sets of images; and
selecting, by the one or more computing devices, a given set of images from the sets of images based on the ranking, the given set of images depicting visual changes occurring over time at the location.

2. The computer implemented method of claim 1, further comprising:
receiving a request for imagery related to the location; and
in response to the request for imagery related to the location, providing one or more images from the selected set of images based on the ranking.

3. The method of claim 1, wherein the first 3D geometry depicts objects at the location at a first time and the second 3D geometry depicts objects at the location at a second time, the second time occurring after the first time.

4. The method of claim 1, wherein generating the first and second 3D geometries of the location comprises reconstructing a geometric view of the location using image data associated with images from the sets of images.

5. The method of claim 1, wherein generating the first and second 3D geometries of the location comprises extracting, from the sets of images, feature data regarding the physical features of objects depicted in the images.

6. The method of claim 1, wherein ranking the sets of images further comprises:
determining change scores for one or more regions in the location, the change scores determined based on a visual difference in the given physical feature depicted in corresponding areas of the first and second 3D geometries; and
wherein the selecting the given set of images is based at least in part on the change scores.

7. The method of claim 2, wherein the ranking further comprises ordering the sets of images based on an amount of visible changes determined for the given physical feature depicted in each set.

8. The method of claim 2, wherein providing the one or more of images from the selected set of images based on the ranking comprises:
determining whether the visual changes of the given physical feature in images from the selected set of images satisfies a predetermined change threshold level; and
the one or more images are provided when the visual changes satisfy the predetermined change threshold level.

9. The method of claim 2, wherein providing the one or more of images from the selected set of images comprises:
receiving a request for images of the location based on an identified physical feature; and
wherein the one or more images depict changes of the identified physical feature that occurred over time at the location.

10. The method of claim 2, wherein providing the one or more of images comprises:
identifying a landmark within a viewing angle of the selected images associated with the location; and
wherein the one or more images depict changes to the landmark over time.

11. A non-transitory computer readable medium, storing instructions that, when executed by one or more processors, cause the one or more processors to perform a method, the method comprising:
identifying, by the one or more processors, sets of images captured at a location over a period of time, the sets of images depicting objects at the location;
generating, by the one or more processors, a first and second a 3D geometry of the location based on the sets of images, the first and second 3D geometries depicting physical features of objects at the location at different times;
comparing features in corresponding areas of the first and second 3D geometries of the location:
determining change scores for one or more regions in the location over the period of time, the change scores determined based on a visual difference in physical features depicted in corresponding areas of the first and second 3D geometries;
ranking, by the one or more processors, the sets of images based on the change scores;
determining whether the change scores for the set of images associated with a particular region satisfy a predetermined change threshold; and
providing for display one or more of the set of images associated with the particular region if the change scores satisfy the predetermined change threshold, the one or more of the set of images depicting visual changes occurring over time at the location.

12. A system, comprising:
a memory; and
one or more processors coupled to the memory, the one or more processors being configured to:
identify sets of images captured at a location over a period of time, the sets of images depicting objects at the location;
generate a first and a second 3D geometry of the location based on the sets of images, the first and second 3D geometries depicting physical features of objects at the location at different times, wherein each 3D geometry represents a visual reconstruction of the objects in the sets of images;
determine visual changes at the location over the period of time for a given physical feature of the objects depicted in images from the sets of images, based on at least a comparison of features in corresponding areas of the first and second 3D geometries of the location;
rank the sets of images based on the determined visual changes for each set of the sets of images; and
select a given set of images from the sets of images based on the ranking, the given set of images depicting visual changes occurring over time at the location.

13. The system of claim 12, wherein the processors are further configured to:
receive a request for imagery related to the location; and
in response to the request for imagery related to the location, provide one or more images from the selected set of images.

14. The system of claim 12, wherein the first 3D geometry depicts objects at the location at a first time and the second 3D geometry depicts objects at the location at a second time, the second time occurring after the first time.

15. The system of claim 12, wherein to generate the first and second 3D geometries of the location comprises reconstructing a geometric view of the location using image data associated with images from the sets of images.

16. The system of claim 12, wherein ranking the sets of images comprises:
determining change scores for one or more regions in the location, the change scores determined based on a visual difference in the given physical feature depicted in corresponding areas of the first and second 3D geometries associated with the sets of images; and wherein the selecting the given set of images is based at least in part on the change scores.

17. The system of claim 12, wherein the ranking further comprises ordering the sets of images based on an amount of visible changes determined for the given physical feature depicted in each set.

18. The system of claim 13, wherein to provide the one or more of images from the selected set of images based on the ranking comprises:

determine whether the visual changes of the given physical feature in images from the selected set of images satisfies a predetermined change threshold level; and the one or more images are provided when the visual changes satisfy the predetermined change threshold level.

19. The system of claim 13, wherein to provide the one or more of images from the selected set of images comprises:

receiving a request for images of the location based on an identified physical feature; and wherein the one or more images depict changes of the identified physical feature that occurred over time at the location.

20. The system of claim 13, wherein to provide the one or more of images from the selected set of images comprises:

identifying a landmark within a viewing angle of the selected images associated with the location; and wherein the one or more images depict changes to the landmark over time.

\* \* \* \* \*